(12) United States Patent
Fujimoto et al.

(10) Patent No.: US 6,953,263 B1
(45) Date of Patent: Oct. 11, 2005

(54) LINEAR LIGHT SOURCE AND IMAGE READING DEVICE PROVIDED WITH THIS

(75) Inventors: Hisayoshi Fujimoto, Kyoto (JP); Hiroaki Onishi, Kyoto (JP); Norihiro Imamura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/869,680

(22) PCT Filed: Dec. 27, 1999

(86) PCT No.: PCT/JP99/07381

§ 371 (c)(1), (2), (4) Date: Jul. 3, 2001

(87) PCT Pub. No.: WO00/45589

PCT Pub. Date: Aug. 3, 2000

(30) Foreign Application Priority Data

Jan. 26, 1999 (JP) .............................. 11-016797
Jan. 26, 1999 (JP) .............................. 11-016798

(51) Int. Cl.$^7$ ............................. F21S 19/00; G02F 1/13
(52) U.S. Cl. ....................... 362/227; 362/230; 358/475
(58) Field of Search ............................... 362/555, 800, 362/545, 253, 234, 227, 252, 230, 235; 358/475, 358/483, 482, 484

(56) References Cited

U.S. PATENT DOCUMENTS

| 5,283,425 A | * | 2/1994 | Imamura ..................... 358/475 |
| 5,313,289 A | * | 5/1994 | Nagane et al. .............. 358/475 |
| 5,430,484 A | | 7/1995 | Nagane et al. .............. 348/370 |

FOREIGN PATENT DOCUMENTS

| JP | 3-97276 | 4/1991 |
| JP | 3-258158 | 11/1991 |
| JP | 6-64228 | 4/1994 |
| JP | 6-98096 | 4/1994 |
| JP | 10-190945 | 7/1998 |

* cited by examiner

Primary Examiner—Thomas M. Sember
Assistant Examiner—B Q Truong
(74) Attorney, Agent, or Firm—Hamre, Schumann, Mueller & Larson, P.C.

(57) ABSTRACT

A linear light source (A) including an insulating substrate (1), a plurality of light emitting elements (3) arranged in columns on the substrate (1), a wiring pattern (2) connected with the light emitting elements (3) and co formed on the substrate (1) so as to divide the light emitting elements (3) into a plurality of groups ($B_1$ to $B_n$), and first and second terminal units (23a, 23b) in continuity with the wiring pattern (2). The plurality of light emitting elements (3) define a plurality of clearances (P1 to $P_{2-1}$) between adjacent light emitting elements, the clearances (P P1 to $P_{2-1}$) being adjusted so as to have different lengths.

19 Claims, 7 Drawing Sheets

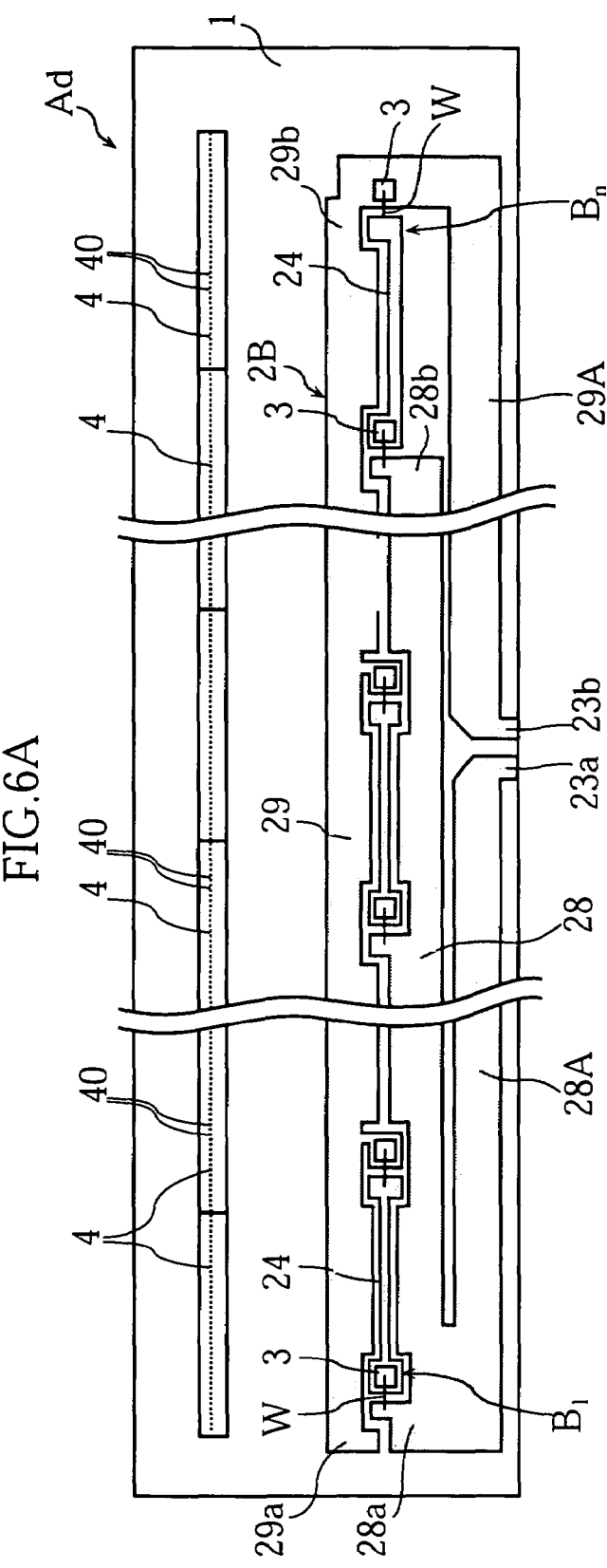
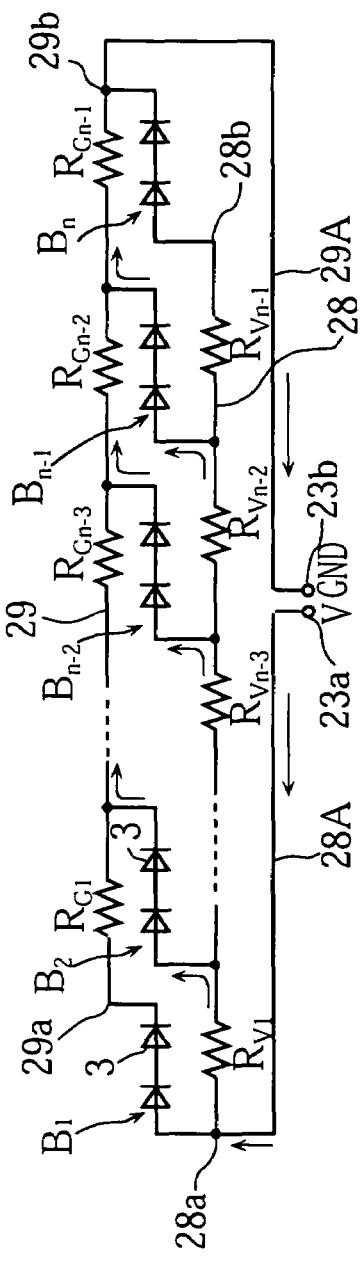
FIG.6A
FIG.6B

LINEAR LIGHT SOURCE AND IMAGE READING DEVICE PROVIDED WITH THIS

TECHNICAL FIELD

The present invention relates to a linear light source used for irradiating a linear region with light. It also relates to an image reading apparatus incorporating such a linear light source.

BACKGROUND ART

Conventionally, various linear light sources are used in image reading apparatus. FIG. 7A illustrates an example of prior-art linear light source. The light source includes an insulating rectangular substrate 90 and a plurality of LEDs (light emitting diodes) 92. The substrate 90 has a surface formed with a wiring pattern 8 (darkened portion). The LEDs 92 are arranged at a predetermined pitch in a row extending longitudinally of the substrate 90.

The wiring pattern 8 includes two wiring portions extending longitudinally of the substrate 92, i.e., a first wiring portion 80 and a second wiring portion 81. The first wiring portion 80 has one end connected to a first terminal 83a, whereas the second wiring portion 81 has one end connected to a second terminal 83b. The above-described row of LEDs 92 is arranged between the first wiring portion 80 and the second wiring portion 81. The wiring pattern 8 further includes a plurality of auxiliary wiring portions 82 which are also arranged between the first wiring portion 80 and the second wiring portion 81.

As shown in FIG. 7A, each auxiliary wiring portion 82 has a left end at which is disposed one LED 92, which is connected to the first wiring portion 80 via a wire W. Other LEDs 92 are disposed at predetermined portions of the second wiring portion 81. Each of these LEDs 92 is connected via a wire W to the right end of the corresponding auxiliary wiring portion 82.

FIG. 7B is a circuit diagram of the above-described linear light source. As will be understood from this figure, the plurality of LEDs 92 are divided into a plurality of groups $b_1 \sim b_n$ (each group including two LEDs 92 connected in series). These groups $b_1 \sim b_n$ are connected in parallel to each other with respect to the first and the second wiring portions 80, 81. With this structure, when a predetermined voltage is applied across the first and the second terminals 83a, 83b, the plurality of LEDs 92 emit light.

Although the above-described prior art linear light source can be used in various types of image reading apparatus, it has the following problems. Although the wiring pattern 8 conducts a current well, the electrical resistance is not zero. Therefore, in the prior art structure shown in FIG. 7A, due to this inherent electrical resistance, the luminosity of light emitted from the LEDs 92 which belong to one group (e.g., group $b_1$) does not equal to the luminosity of light emitted from LEDs 92 which belong to another group (e.g., group $b_3$).

In more detail with reference to FIG. 7B, since the wiring pattern 8 itself has an electrical resistance, the first wiring portion 80 has a resistance $R_V$ between adjacent groups ($b_i$ and $b_{i+1}$), whereas the second wiring portion 81 has a resistance $R_G$ between adjacent groups ($b_i$ and $b_{i+1}$). Therefore, a voltage applied to the LEDs in a group located farther from the first and the second terminals 83a, 83b becomes smaller than the voltage applied to the LEDs in a group located closer to the terminals. As a result, LEDs in each group emit a different amount of light from each other.

Specifically, the LEDs 92 which belong to the group $b_1$ emit the brightest light whereas the LEDs 92 in the group $b_n$ emits the weakest light. Light emitted from the LEDs becomes gradually weaker from the group $b_2$ to the group $b_{n-1}$.

With the prior art linear light source having the above-described characteristics, it is impossible to uniformly illuminate a document to be read with light, so that an appropriately read image may not be obtained. Such a problem occurs notably when an image reading apparatus is driven at a low voltage (for example, 5V).

DISCLOSURE OF THE INVENTION

An object of the present invention, which is proposed to solve or alleviate the above-described problem, is to provide a linear light source which is capable of uniformly illuminating a linear region with light. Another object of the present invention is to provide an image reading apparatus incorporating such a linear light source.

In accordance with a first aspect of the present invention, there is provided a linear light source comprising: an insulating substrate; a plurality of light emitting elements arranged in a row on the substrate, a wiring pattern formed on the substrate in electrical connection with the plurality of light emitting elements for dividing the plurality of light emitting elements into a plurality of groups; and a first and a second terminals in conduction with the wiring pattern; wherein the plurality of light emitting elements define a plurality of intervals between adjacent light emitting elements; one of the plurality of intervals being different in length from another of the intervals.

With such a structure, by adjusting the intervals defined between the light emitting elements, it is possible to uniformly illuminate the linear region of the document even if the luminosity of light emitted from the light emitting elements is not uniform.

In a preferred embodiment of the present invention, the interval between weaker light emitting elements is shorter than the interval between brighter light emitting elements.

Preferably, the wiring pattern forms a plurality of current paths which correspond to the plurality of groups and extend from the first terminal to the second terminal. The interval defined between the light emitting elements of a group corresponding to a shorter one of the current paths is narrower than the interval defined between the light emitting elements of another group corresponding to a longer one of the current paths.

Preferably, each of the plurality of groups includes at least two light emitting elements. Of course, each group may include three or more light emitting elements.

According to a preferred embodiment, the substrate includes a first end and a second end opposite thereto, and the row of light emitting elements extends in a direction from the first end toward the second end, the plurality of intervals becoming gradually narrower in said direction.

According to another preferred embodiment, the substrate includes a first end, a second end opposite thereto, and an intermediate portion located between the first end and the second end, the row of light emitting elements extending from the first end to the second end, the plurality of intervals becoming gradually narrower from the intermediate portion toward the first end and the second end.

The first terminal and the second terminal may be disposed at the intermediate portion of the substrate.

Preferably, the wiring pattern includes a first and a second wiring portions extending longitudinally of the substrate, the plurality of light emitting elements being arranged between the first wiring portion and the second wiring portion.

Preferably, the linear light source may further comprise a plurality of photo-electric converters mounted on the substrate.

According to a second aspect of the present invention, there is provided an image reading apparatus comprising: a case; a transparent plate supported by the case; an image forming lens supported by the case; and a linear light source for illuminating a document to be read, the linear light source including an insulating substrate, a plurality of light emitting elements arranged in a row on the substrate, a wiring pattern formed on the substrate in electrical connection with the plurality of light emitting elements for dividing the light emitting elements into a plurality of groups, and a first and a second terminals in conduction with the wiring pattern; wherein he plurality of light emitting elements define a plurality of intervals between adjacent light emitting elements, one of the plurality of intervals being different in length from another of the intervals.

According to a third aspect of the present invention, there is provided a linear light source comprising: an insulating substrate having a first end and a second end opposite thereto; a plurality of light emitting elements supported on the substrate and arranged in a row extending from the first end to the second end; a wiring pattern in electrical connection with the plurality of light emitting elements, the wiring pattern including a first and a second wiring portions extending from the first end to the second end of the substrate; and a first and a second terminals formed on the substrate; wherein the first wiring portion includes a connecting end located close to the first end of the substrate, the second wiring portion including a connecting end located close to the second end of the substrate, the connecting end of the first wiring portion being connected to the first terminal, the connecting end of the second wiring portion being connected to the second terminal, whereby the plurality of light emitting elements emit light of substantially equal brightness.

Preferably, the plurality of light emitting elements are arranged between the first wiring portion and the second wiring portion and divided into a plurality of groups by the wiring pattern.

In a preferred embodiment, the first and the second terminals are arranged closer to the second end than to the first end of the substrate.

In another preferred embodiment, the substrate includes an intermediate portion located between the first end and the second end of the substrate, the first terminal and the second terminal being disposed at the intermediate portion.

Preferably, the plurality of light emitting elements are arranged on the substrate at substantially equal intervals.

According to a fourth aspect of the present invention, there is provided an image reading apparatus comprising: a case; a transparent plate supported by the case; an image forming lens supported by the case; and a linear light source for illuminating a document to be read, the linear light source including an insulating substrate having a first end and a second end opposite thereto, a plurality of light emitting elements supported on the substrate and arranged in a row extending from the first end to the second end, a wiring pattern in electrical connection with the plurality of light emitting elements, the wiring pattern including a first and a second wiring portions extending from the first end to the second end of the substrate, and a first and a second terminals formed on the substrate; wherein the first wiring portion includes a connecting end located close to the first end of the substrate, the second wiring portion including a connecting end located close to the second end of the substrate, the connecting end of the first wiring portion being connected to the first terminal, the connecting end of the second wiring portion being connected to the second terminal so that the plurality of light emitting elements emit light of substantially equal brightness.

Other features and advantages of the present invention will become clearer from the detailed description of preferred embodiments given below with reference to the accompanying drawings.

BRIEF DESCRIPTION OF THE DRAWINGS

FIG. 6A is a plan view showing a linear light source in accordance with a fifth embodiment of the present invention, and FIG. 6B is a circuit diagram of the same linear light source.

BEST MODE FOR CARRYING OUT THE INVENTION

Preferred embodiments of the present invention will be described below with reference to FIGS. 1A–6B. Throughout these figures, the elements which are identical or similar are designated by the same reference signs.

Figure 1A:
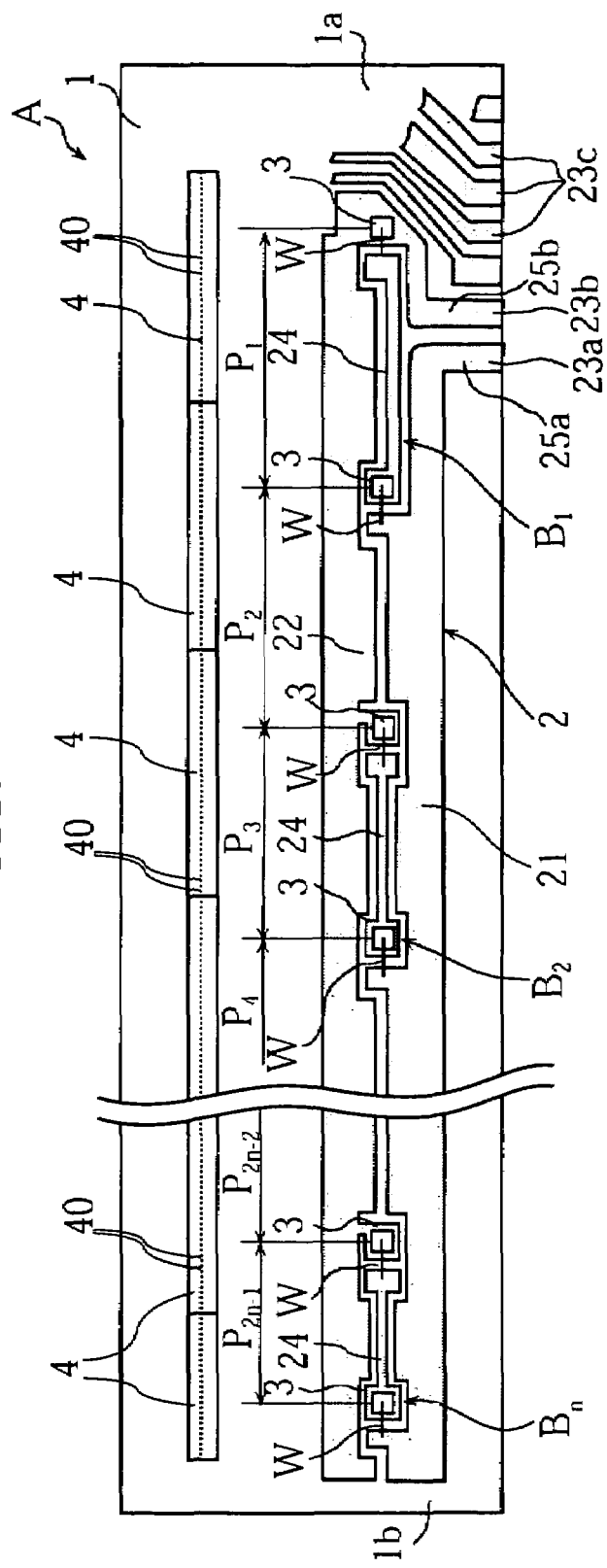
FIG. 1A is a plan view showing a linear light source in accordance with a first embodiment of the present invention.
Figure 1B:
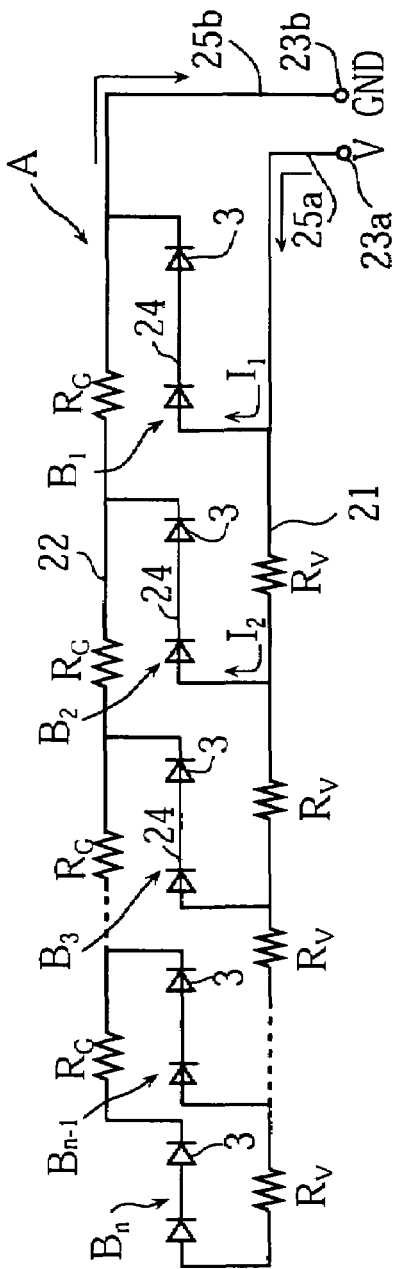
FIG. 1B is a circuit diagram of the same linear light source.

A reference is first made to FIGS. 1A and 1B. FIG. 1A is a plan view showing a linear light source A in accordance with a first embodiment of the present invention. FIG. 1B is a circuit diagram of the light source A. As shown in FIG. 1A, the light source A includes a rectangular insulating substrate 1, a wiring pattern 2 (darkened portion) provided on a surface of the substrate 1, a plurality of LEDs 3 mounted on the wiring pattern 2, and a plurality of photo-electric converters 4. The substrate 1 may be made of a ceramic material or a glass-fiber-reinforced epoxy resin. The plurality of LEDs 3 are arranged in a row extending longitudinally of the substrate 1.

Figure 7A:
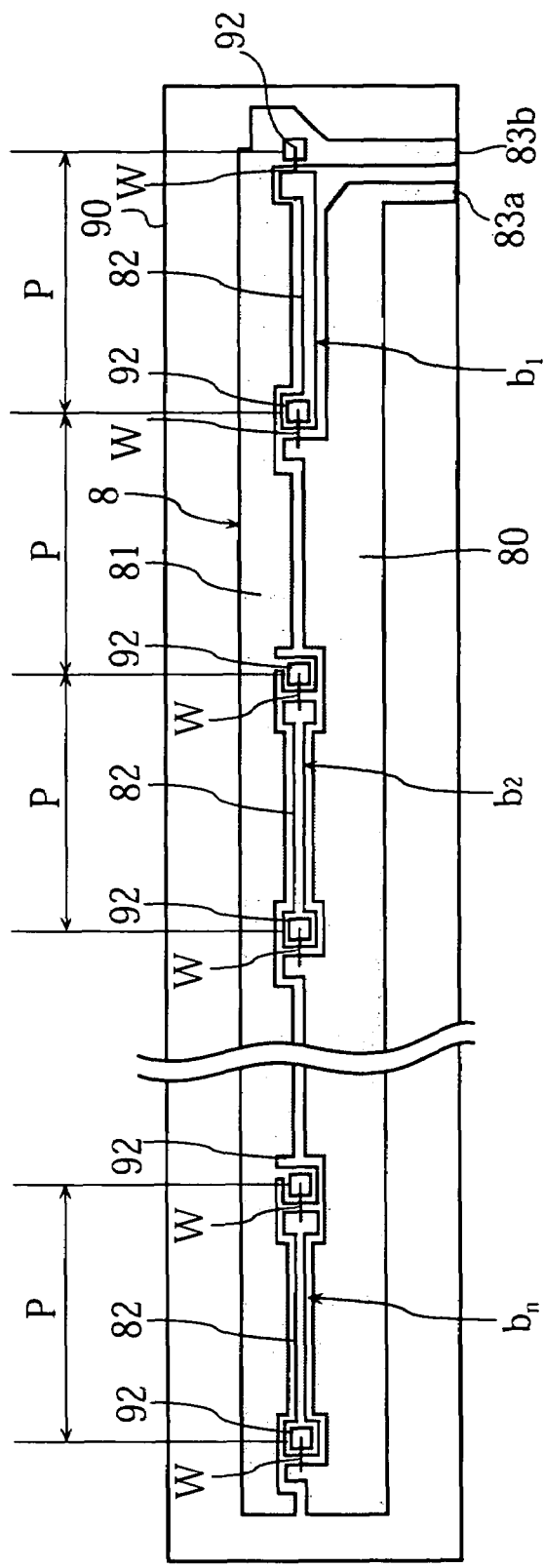
FIG. 7A is a plan view showing a conventional linear light source.
Figure 7B:
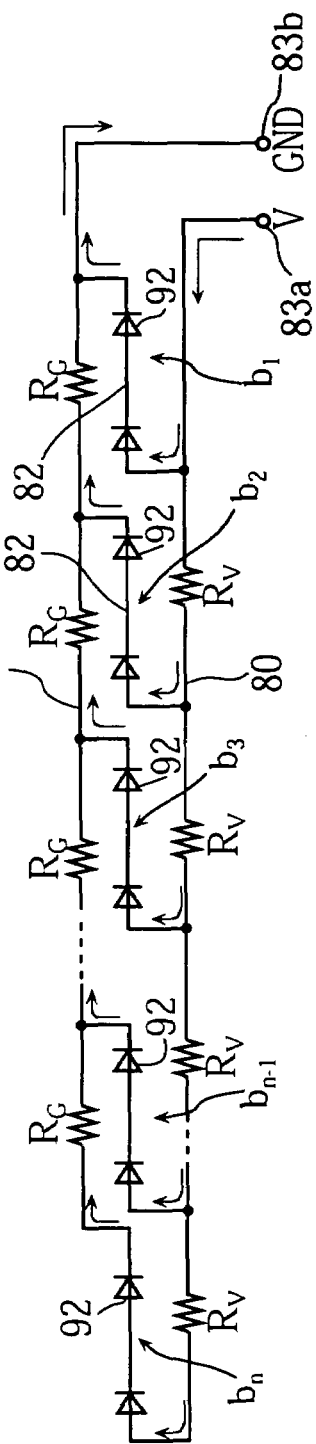
FIG. 7B is a circuit diagram of the same linear light source.

The wiring pattern 2 may be formed by etching a metal film (e.g., a copper foil) applied on the substrate 1 by vapor deposition or sputtering. The basic structure of the wiring pattern 2 is similar to the wiring pattern (FIG. 7A) of the prior art described before. Specifically, the wiring pattern 2 includes two wiring portions extending longitudinally of the substrate 1, i.e., a first wiring portion 21 and a second wiring portion 22. The first wiring portion 21 has one end connected to a first terminal 23a, whereas the second wiring portion 22 has one end connected to a second terminal 23b. The row of LEDs 3 is arranged between the first wiring portion 21 and the second wiring portion 22.

The wiring pattern 2 further includes a plurality of auxiliary wiring portions 24, and wirings (not shown) for connecting the photo-electric converters 4 to additional terminals 23c. The auxiliary wiring portions 24 are arranged between the first wiring portion 21 and the second wiring portion 22.

As shown in FIG. 1A, each of selected ones of the plural LEDs 3 is mounted on a left end of a respective auxiliary wiring portion 24 and connected to the first wiring portion 21 via a wire W. The remaining LEDs 3 are mounted at suitable positions of the second wiring portion 22, and each of these remaining LEDs 3 is connected to the right end of a respective auxiliary wiring portion 24 via a wire W.

The first and the second terminals 23a, 23b are provided close to each other at one longitudinal end 1a of the substrate 1. The terminals 23a, 23b and the additional terminal 23c are connected to a suitable connector (not shown). Electric power for driving the LEDs 3 is supplied from outside through the connector.

The first wiring portion 21 is formed, at one end thereof (right end in FIG. 1A), with a first short extension 25a connected to the first terminal 23a. Similarly, the second wiring portion 22 is formed, at the right end thereof, with a second extension 25b connected to the second terminal 23b.

Each of the photo-electric converters 4 comprises an elongated IC chip having an obverse surface provided with a plurality of light receiving elements 40. The light receiving elements 40 are arranged at equal intervals longitudinally of the IC chip. Each of the light receiving element 40 outputs electric signals (image signals) corresponding to the received amount of light. As shown in FIG. 1A, the photo-electric converters 4 are spaced from the LEDs 3 and the wiring pattern 2 and arranged in a row extending in the same direction as the row of LEDs 3.

As shown in FIG. 1B, the plurality of LEDs 3 are divided into a plurality of groups $B_1 \sim B_n$ (each group including two LEDs 3 connected in series). These groups $B_1 \sim B_n$ are connected in parallel to each other with respect to the first and the second wiring portions 21, 22. With this structure, when a predetermined voltage is applied across the first and the second terminals 23a, 23b, the plurality of LEDs 3 emit light. More specifically, the second terminal 23b is grounded, and a voltage of e.g., 5V is applied to the first terminal 23a.

Similarly to the prior art structure, since the wiring pattern 2 itself has an electrical resistance, the first wiring portion 21 has a resistance $R_V$ between adjacent groups ($B_i$ and $B_{i+1}$), whereas the second wiring portion 22 has a resistance $R_G$ between adjacent groups ($B_i$ and $B_{i+1}$). Therefore, the voltage applied to the LEDs 3 in a group located farther from the first and the second terminals 23a, 23b (i.e., having a longer current path) becomes smaller than the voltage applied to the LEDs in a group located closer to the terminals (i.e., having a shorter current path). As a result, the LEDs 3 belonging to the group $B_1$ emit the brightest light, whereas the LEDs 3 belonging to the group $B_n$ emits the weakest light. Light emitted from the LEDs 3 becomes gradually weaker from the group $B_2$ to the group $B_{n-1}$.

The light source A of the present invention is characterized in that the plurality of LEDs 3 are arranged at different intervals. Specifically, when the number of groups of LEDs 3 is n, the total number of intervals (P) defined between the LEDs 3 is 2n−1. As shown in FIG. 1A, the intervals are identified as $P_1, P_2, \ldots, P_{2n-1}$, respectively, from the right end toward the left end of the substrate 1. In the first embodiment of the present invention, the intervals $P_1, P_2, \ldots, P_{2n-1}$ are so set as to satisfy the relation $P_1 > P_2 > \ldots > P_{2n-1}$.

With such an arrangement, a weaker (or darker) LED 3 is located close to another LED 3 for equalizing luminance over the entire row of LEDs. Therefore, with the light source A of the present invention, it is possible to uniformly illuminate a linear region of a document to be read.

Figure 2:
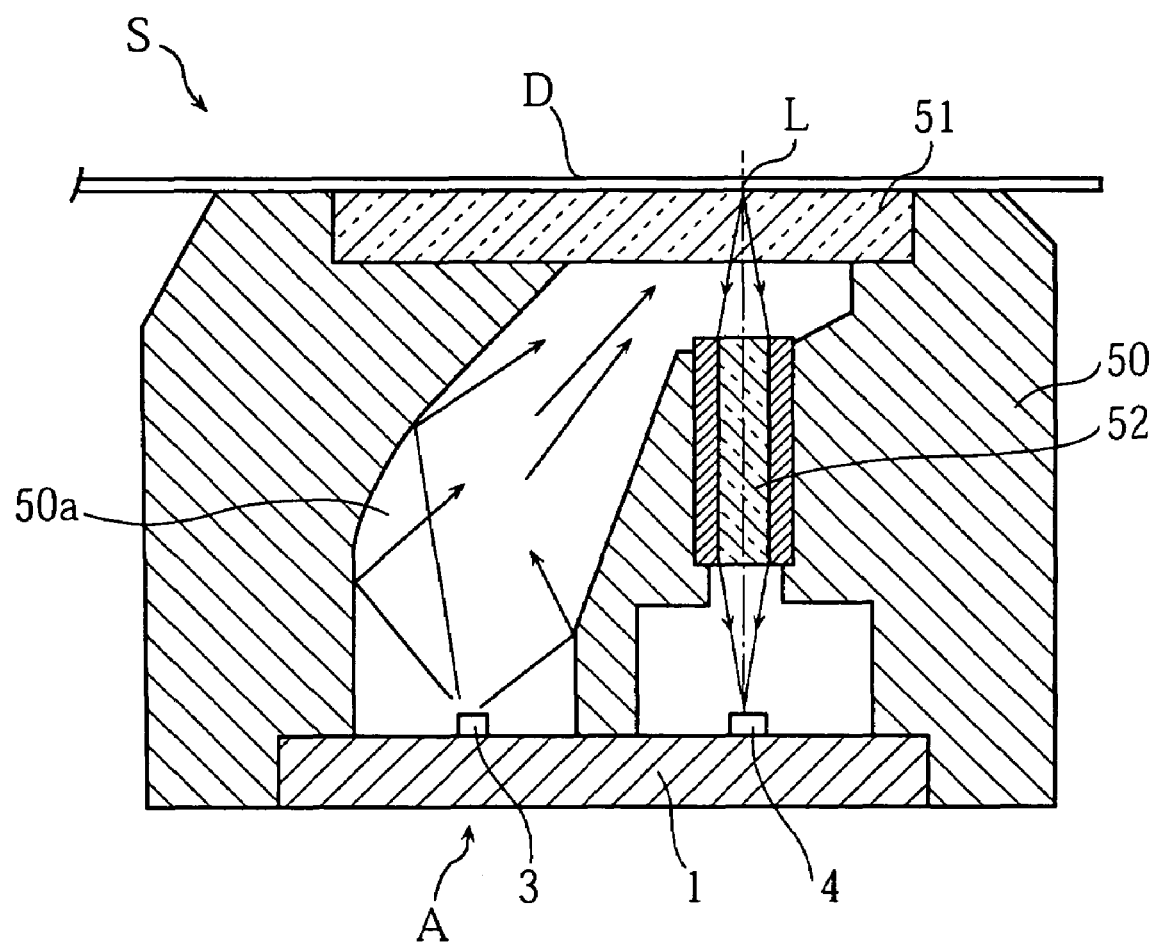
FIG. 2 is a sectional view showing an image reading apparatus incorporating the linear light source of FIG. 1A.

Next, reference is made to FIG. 2. This figure is a sectional view showing an image reading apparatus S incorporating the above-described linear light source A. The image reading apparatus S includes a case 50 formed of a synthetic resin, a transparent plate 51 mounted at an upper surface portion of the case 50, and an image-forming lens 52 mounted in the case 50 in facing relationship to the reverse surface of the transparent plate 51. The substrate 1 of the above-described linear light source A is mounted at a bottom surface portion of the case 50. The case 50 includes a light path 50a defined therein. Light emitted from LEDs 3 of the light source A is guided along the light path 50a to reach an image read line L defined on an obverse surface of the transparent plate 51. Then, the light is reflected on a document D disposed on the transparent plate 51 and passes through the image-forming lens 52 to be collected. The collected light is received by the photo-electric converters 4 of the light source A. The photo-electric converters 4 are located directly below the image-forming lens 52.

Though not illustrated, the transparent plate 51 is upwardly provided with a platen roller for transferring the document D in a secondary scanning direction (which is perpendicular to the image read line L). By intermittently transferring the document D in the secondary scanning direction by the platen roller, an image of the document D is read line by line. However, when the image reading apparatus S is utilized as a hand scanner, the platen roller is not necessary. In such a case, the image reading apparatus S itself is moved in the secondary scanning direction for reading an image of the document D.

Figure 3:
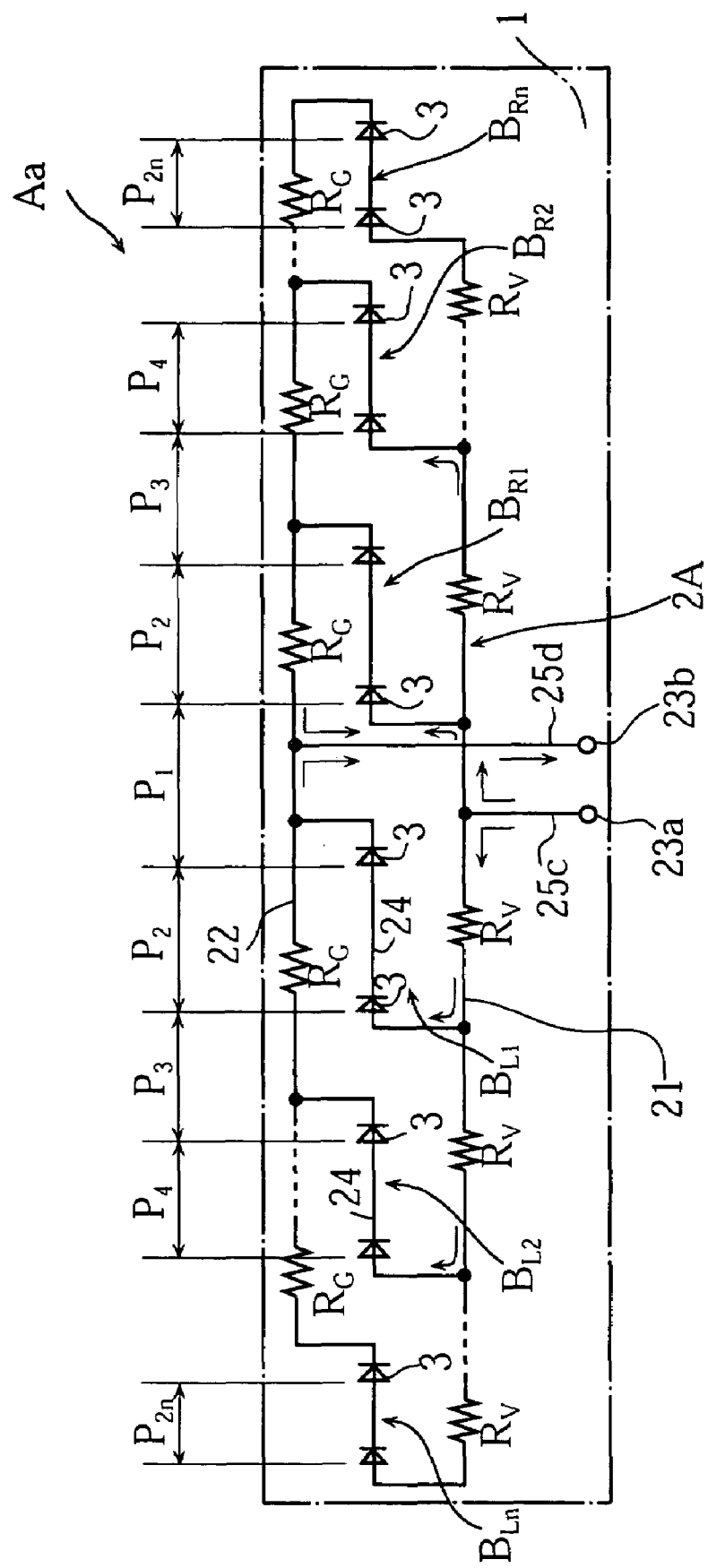
FIG. 3 is a circuit diagram of a linear light source in accordance with a second embodiment of the present invention.

FIG. 3 schematically illustrates principal portions of a linear light source Aa in accordance with a second embodiment of the present invention. In this and the subsequent embodiments, description is omitted with respect to the items which are identical or similar to those already described in the first embodiment.

The illustrated light source Aa includes a rectangular substrate 1 formed with a wiring pattern 2A. At the longitudinally central portion of the substrate 1, a first terminal 23a and a nearby second terminal 23b are provided. The wiring pattern 2A includes a first and a second wiring portions 21, 22 extending longitudinally of the substrate 1, and a plurality of auxiliary wiring portions 24 arranged therebetween.

The first wiring portion 21 is connected via a first extension 25c provided at a longitudinally central portion of the substrate 1 to the first terminal 23a. The second wiring portion 22 is connected via a second extension 25d to the second terminal 23b. The second extension 25d is insulated from the first wiring portion 21 by utilizing a non-illustrated jumper or through-hole.

The plurality of LEDs 3 are divided by the first and the second extensions 25c, 25d into a right and a left groups. Each of these groups is further divided into smaller groups or subgroups ($B_{R1} \sim B_{Rn}$ and $B_{L1} \sim B_{Ln}$). Each of the subgroups includes two LEDs 3 connected in series to each other. The subgroups of LEDs 3 are connected in parallel to each other with respect to the first and the second wiring portions 22.

Similarly to the first embodiment, the luminosity of light emitted from the LEDs 3 of the light source Aa varies from one subgroup to another due to the electrical resistances $R_V$, $R_G$ inherent to the first and the second wiring portion 22. Specifically, the LEDs 3 belonging to the subgroup $B_{R1}$ emit the brightest light, but the light from the LEDs become weaker as the location of the subgroups becomes closer to the right end of the substrate 1. Thus, the LEDs 3 belonging to the subgroup $B_{Rn}$ emit the weakest light. This fact holds for the LEDs 3 belonging to the left side subgroups $B_{L1}$~$B_{Ln}$. It is to be noted that the LEDs belonging to mutually corresponding right and left subgroups (e.g., the subgroup $B_{R1}$ vs the subgroup $B_{L1}$, and the subgroup $B_{R2}$ VS the subgroup $B_{L2}$) emit light of the same luminosity.

As shown in FIG. 3, the two LEDs 3 in the subgroup $B_{R1}$ are spaced from each other by an interval $P_2$, whereas the two LEDs 3 in the subgroup $B_{R2}$ are spaced from each other by an interval $P_4$. (Generally, two LEDs 3 in the subgroup $B_{Rn}$ are spaced from each other by an interval $P_{2n}$.) This holds for the subgroups $B_{L1}$~$B_{Ln}$. The subgroup $B_{R1}$ and the subgroup $B_{L1}$ are spaced from each other by an interval $P_1$.

In the second embodiment of the present invention, the intervals $P_1$, $P_2$, $P_3$, ..., $P_{2n}$ are so set as to satisfy the relation $P_1 > P_2 > P_3 > ... > P_{2n}$. With such an arrangement, similarly to the first embodiment, a weaker LED 3 is located close to another LED 3 so that the luminosity of light can be equalized over the entire row of LEDs 3.

In the above-described embodiment, the intervals P between adjacent LEDs 3 are set so that $P_1 > P_2 > P_3 > ... > P_{2n}$. However, the present invention is not limited thereto, and some of these intervals P may be equal to each other (e.g., $P_2 = P_3$). Further, each subgroup may include not less than three LEDs. Moreover, the number of LEDs included in one subgroup may not be equal to the number of LEDs included in another subgroup.

Figure 4A:
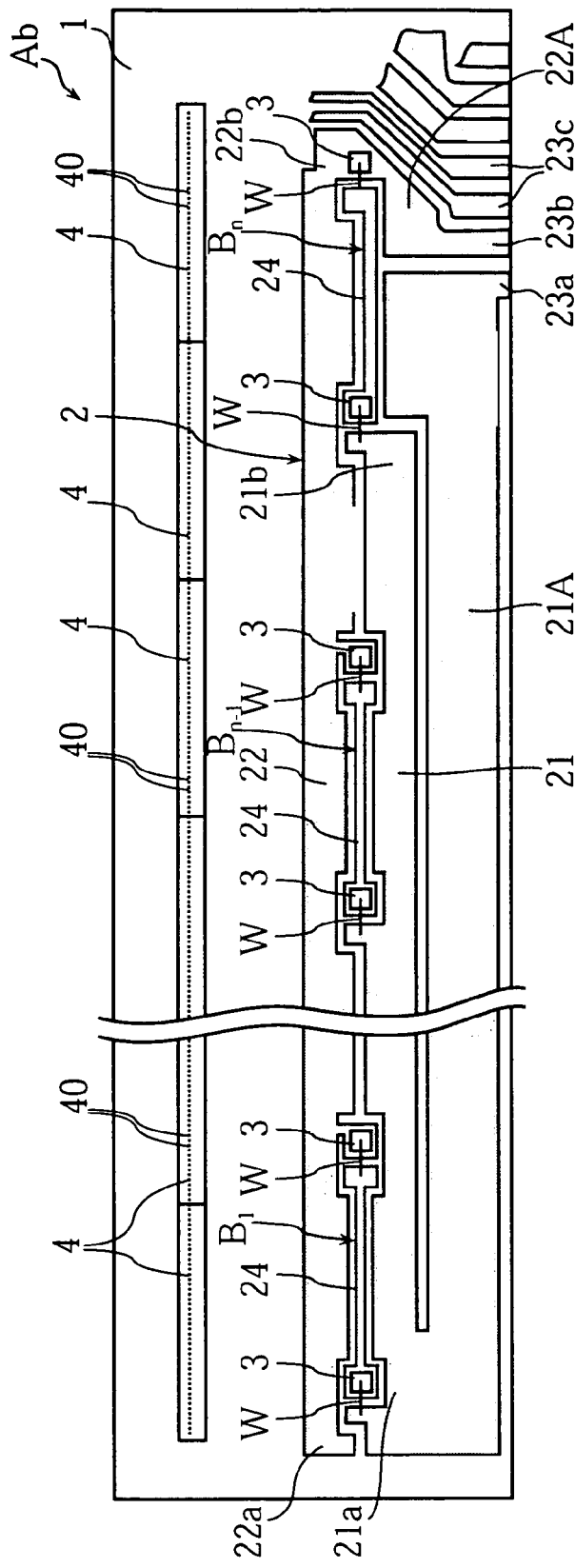
FIG. 4A is a plan view showing a linear light source in accordance with a third embodiment of the present invention.
Figure 4B:
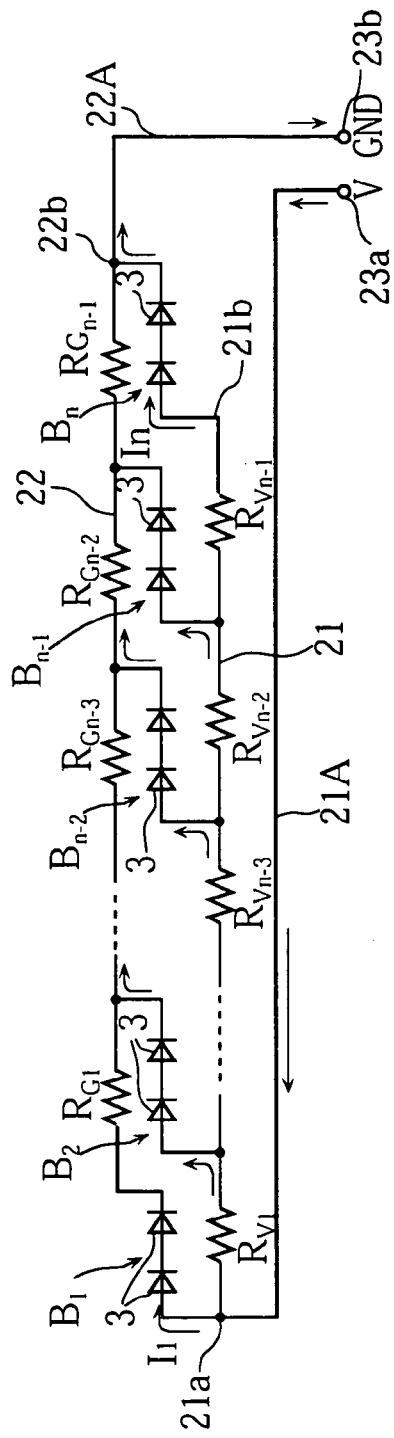
FIG. 4B is a circuit diagram of the same linear light source.

Next, reference is made to FIGS. 4A and 4B. FIG. 4A is a plan view showing a linear light source Ab in accordance with a third embodiment of the present invention. FIG. 4B is a circuit diagram of the light source Ab.

The light source Ab has a basically same structure as that of the light source A shown in FIG. 1A except its characteristic portions. Specifically, the light source Ab includes a rectangular insulating substrate 1, a wiring pattern 2 (darkened portion) formed on the substrate 1, a plurality of LEDs mounted on the wiring pattern 2, and a plurality of photo-electric converters 4.

The wiring pattern 2 includes a first wiring portion 21, a second wiring portion 22 and a plurality of auxiliary wiring portions 24. As shown in FIG. 4A, each of the first wiring portion 21 and the second wiring portion 22 has a generally linear configuration extending longitudinally of the substrate 1. The first wiring portion 21 has a first end 21a (left end in FIG. 4A) and a second end 21b (right end) longitudinally spaced from each other. The second wiring portion 22 has a first end 22a (left end) and a second end 22b (right end) longitudinally spaced from each other. A plurality of auxiliary wiring portions 24 are arranged between the first wiring portion 21 and the second wiring portion 22.

The first end 21a of the first wiring portion 21 is connected, via a first extension 21A, to a first terminal 23a provided adjacent the right end of the substrate 1. For enabling this structure, the first extension 21A is elongated in parallel to the first wiring portion 21. The second end 22b of the second wiring portion 22 is connected, via the second extension 22A, to a second terminal 23b provided adjacent the first terminal 23a. Adjacent the second terminal 23b (right side in FIG. 4A), a plurality of additional terminals 23c are provided. The additional terminals 23c are connected via a predetermined wiring pattern (not shown) to the photo-electric converters 4.

The auxiliary wiring portions 24 are utilized for dividing the plurality of LEDs 3 into a plurality of groups $B_1$~$B_n$ and for connecting these groups in parallel to each other with respect to the first and the second wiring portions 21, 22. Specifically, each LED 3 is bonded to one end (left end) of the corresponding auxiliary wiring portion 24 or to a predetermined portion of the second wiring portion 22. As shown in FIG. 4A, each of the LEDs 3 on the second wiring portion 22 is located close to the right end of the corresponding auxiliary wiring portion 24. Each of the LEDs 3 bonded to the left end of the corresponding auxiliary wiring portion is connected, via a wire W, to the first wiring portion 21. On the other hand, each of the LEDs 3 bonded to the second wiring portion 22 is connected, via a wire W, to the right end of the corresponding auxiliary wiring portion 24. Thus, the plurality of LEDs 3 are divided into a plurality of groups $B_1$~$B_n$ each including two LEDs 3 connected in series. The groups $B_1$~$B_n$ are arranged in the mentioned order from left to right on the substrate 1. Thus, the group $B_1$ is located adjacent the left end 21a of the first wiring portion 21, whereas the group $B_n$ is located adjacent the right end 21b of the first wiring portion 21. In this embodiment, the plurality of LEDs 3 are arranged at substantially equal intervals.

The feature of the light source Ab in accordance with the third embodiment of the present invention lies in that the left end 21a of the first wiring portion 21 and the first terminal 23a located at the right end of the substrate 1 are connected via the elongated first extension 21A. This structure brings about the advantages described in the following.

As shown in FIG. 4B, the first wiring portion 21 inherently has divided electrical resistances designated respectively as $R_{V1}$~$R_{Vn-1}$. The second wiring portion 22 inherently has divided electric resistances designated respectively as $R_{G1}$~$R_{Gn-1}$. Under this condition, consider how each group of LEDs 3 is affected by the resistances between the first end 21a of the first wiring portion 21 and the second end 22b of the second wiring portion 22. As is clear from FIG. 4B, the two LEDs 3 which belong to the group $B_1$ are connected in series to an (n−1) number of resistors $R_{G1}$~$R_{G-1}$ in the second wiring portion 22. On the other hand, the two LEDs 3 which belong to the group $B_2$ are connected in series to the resistor $R_{V1}$ in the first wiring portion 21 and an (n−2) number of resistors $R_{G2}$~$R_{Gn-1}$ in the second wiring portion 22.

Thus, the group $B_1$ and the group $B_2$ are commonly connected to the resistors $R_{G2}$~$R_{Gn-1}$ of the second wiring portion 22. The difference between these groups lies in that, in addition to these resistors, the group $B_1$ is connected to the resistor $R_{G1}$ of the second wiring portion 22, whereas the group $B_2$ is connected to the resistor $R_{V1}$ of the first wiring portion 21. In any case, the group $B_1$ and the group $B_2$ are connected to the same number (n−1) of resistors. Therefore, by appropriately adjusting the resistance, it is possible to substantially equalize the voltage applied to the LEDs 3 in the group $B_1$ and the voltage applied to the LEDs 3 in the group $B_2$. As a result, it is possible to substantially equalize the luminosity of light emitted from the LEDs 3 in the group $B_1$ and the luminosity of light emitted from the LEDs 3 in the group $B_2$.

Similarly, the LEDs 3 in the group $B_i$ ($3 \leq i \leq n-1$) are connected in series to the resistors $R_{V1} \sim R_{Vi-1}$ of the first wiring portion 21 and the resistors $R_{Gi} \sim R_{Gn-1}$ of the second wiring portion 22. The LEDs 3 which belong to the group $B_n$ are connected in series to the resistors $R_{V1} \sim R_{Vn-1}$ in the first wiring portion 21. In any case, the two LEDs in each group are connected to an (n–1) number of resistors. Therefore, by appropriately adjusting the resistance, it is possible to substantially equalize the luminosity of light emitted from the LEDs 3 in the group $B_j$ ($3 \leq j \leq n$) and the luminosity of light emitted from the LEDs 3 in the group $B_1$ or $B_2$.

The first extension 21A and the second extension 22A also inherently have an electrical resistance. Therefore, when a current flows through the extensions 21A and 22A, a voltage drop occurs at each extension in accordance with the resistance. However, since the voltage drop is common to the LEDs 3 in the groups $B_1 \sim B_n$, it does not adversely affect the uniformity of light luminosity of the LEDs 3.

Figure 5A:
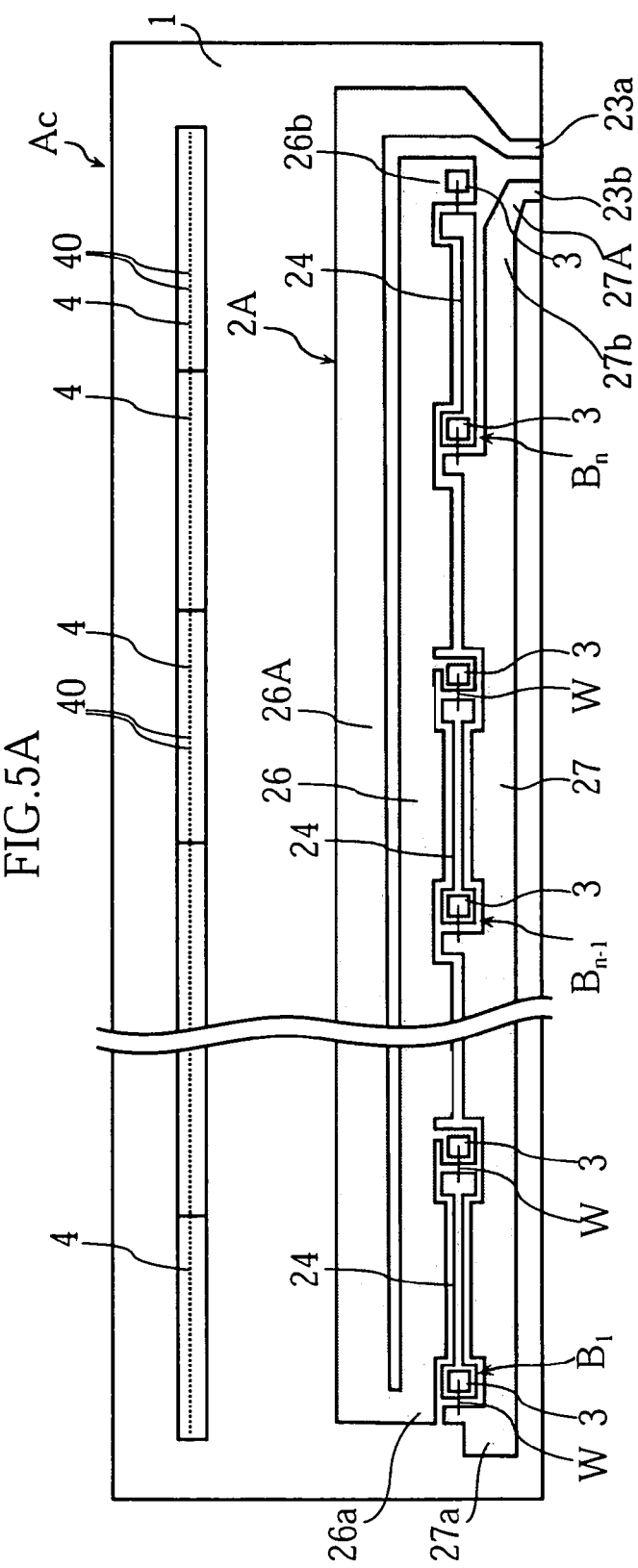
FIG. 5A is a plan view showing a linear light source in accordance with a fourth embodiment of the present invention.
Figure 5B:
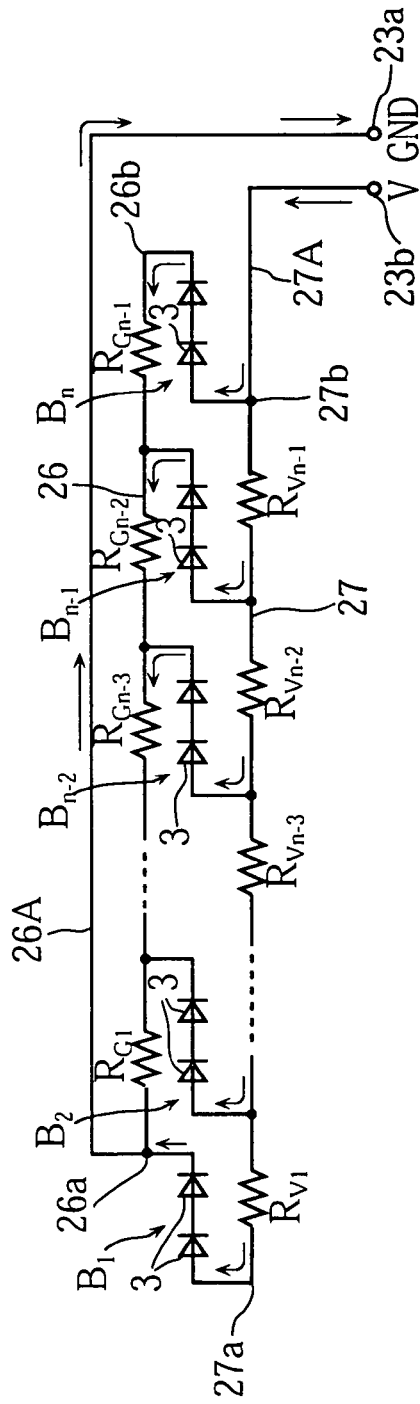
FIG. 5B is a circuit diagram of the same linear light source.

Next, a reference is made to 5A and 5B. FIG. 5A is a plan view showing a linear light source Ac in accordance with a fourth embodiment of the present invention. FIG. 5B is a circuit diagram of the light source Ac.

As shown in FIG. 5A, a wiring pattern 2A formed on a rectangular substrate 1 includes a first wiring portion 26 connected to a first terminal 23a, and a second wiring portion 27 connected to a second terminal 23b. As shown in FIG. 5B, the first terminal 23a is grounded. A predetermined voltage is applied to the second terminal 23b.

The first wiring portion 26, which is elongated longitudinally of the substrate 1, includes a left end 26a and a right end 26b. As shown in FIG. 5A, the left end 26a is located far from the first and the second terminals 23a, 23b, whereas the right end 26b is located close to these terminals. The left end 26a is connected to a first extension 26A. The first extension 26A is elongated longitudinally of the substrate 1 for connecting the left end 26a of the first wiring portion 26 to the first terminal 23a. The second wiring portion 27, which is also elongated in parallel with the first wiring portion 26, includes a left end 27a and a right end 27b. The right end 27b located closer to the terminals 23a, 23b than the left end 27a is connected, via a second extension 27A having a short length, to the second terminal 23b. Between the left end 26a of the first wiring portion 26 and the right end 27b of the second wiring portion 27, the first wiring portion 26 inherently has divided electrical resistances $R_{G1} \sim R_{Gn-1}$ whereas the second wiring portion 27 inherently has divided resistances $R_{V1} \sim R_{Vn-1}$.

As is clear from FIG. 5B which shows the main circuit of the light source Ac, the LEDs 3 are divided into a plurality of groups $B_1 \sim B_n$ (each including two LEDs 3) also in this embodiment. Similarly to the above-described third embodiment, the LEDs 3 which belong to each group $B_i$ ($1 \leq i \leq n$) are connected in series to an (n–1) number of resistors. Therefore, by appropriately adjusting each resistance, it is possible to substantially equalize the luminosity of light emitted from each group $B_1 \sim B_n$ of LEDs 3.

Next, reference is made to FIGS. 6A and 6B. FIG. 6A is a plan view showing a linear light source Ad in accordance with a fifth embodiment of the present invention. FIG. 6B is a circuit diagram of the light source Ad.

The light source Ad includes a rectangular substrate 1, a wiring pattern 2B formed on the substrate 1, a plurality of LEDs 3 mounted on the wiring pattern 2B, and a plurality of photo-electric converters 4 arranged in a row extending longitudinally of the substrate 1. As shown in FIG. 6A, at the longitudinally central portion of the substrate 1, a first terminal 23a and a second terminal 23b are provided. The first terminal 23a is connected to a first extension 28A extending toward the left end of the substrate 1. On the other hand, the second terminal 23b is connected to a second extension 29A extending toward the right end of the substrate 1. The left end of the first extension 28A is connected to a left end 28a of the first wiring portion 28, whereas the right end of the second extension 29A is connected to a right end 29b of the second wiring portion 29.

As shown in FIG. 6B, also in this embodiment, the LEDs 3 are divided into a plurality of groups $B_1 \sim B_n$ and the LEDs 3 which belong to each group $B_i$ ($1 \leq i \leq n$) are connected in series to the same number of resistors. Therefore, by appropriately adjusting each resistance, it is possible to substantially equalize the luminosity of light emitted from each group $B_1 \sim B_n$ of the LEDs 3.

Although LEDs are used in the above-described embodiments, another kind of device may be used for light emitting elements. Further, the number of light emitting elements and the number of groups may be modified. Moreover, the linear light source in accordance with the present invention may be appropriately used not only for an image reading apparatus but also for other apparatus.

What is claimed is:

1. A linear light source comprising:
   an insulating substrate;
   a plurality of light emitting elements arranged in a row on the substrate;
   a wiring pattern formed on the substrate in electrical connection with the plurality of light emitting elements for dividing the plurality of light emitting elements into a plurality of groups; and
   a first and a second terminals in conduction with the wiring pattern;
   wherein the plurality of light emitting elements define a plurality of intervals between adjacent light emitting elements, one of the plurality of intervals being different in length from another of the intervals; and
   wherein the substrate also carries image reading elements provided separately from the plurality of light emitting elements.

2. The linear light source according to claim 1, wherein weaker light emitting elements that emit less light than brighter light emitting elements are present and the interval between weaker light emitting elements is shorter than the interval between brighter light emitting elements.

3. The linear light source according to claim 1, wherein the wiring pattern forms a plurality of current paths which correspond to the plurality of groups and extend from the first terminal to the second terminal, and wherein the interval defined between the light emitting elements of a group corresponding to a shorter one of the current paths is narrower than the interval defined between the light emitting elements of another group corresponding to a longer one of the current paths.

4. The linear light source according to claim 1, wherein each of the plurality of groups includes at least two light emitting elements.

5. The linear light source according to claim 1, wherein the substrate includes a first end and a second end opposite thereto, the row of light emitting elements extending in a direction from the first end toward the second end, the plurality of intervals becoming gradually narrower in said direction.

6. The linear light source according to claim 1, wherein the substrate includes a first end, a second end opposite thereto, and an intermediate portion located between the first end and the second end, the row of light emitting elements extending from the first end to the second end, the plurality of intervals becoming gradually narrower from the intermediate portion toward the first end and the second end.

7. The linear light source according to claim 6, wherein the first terminal and the second terminal are disposed at the intermediate portion of the substrate.

8. The linear light source according to claim 1, wherein the wiring pattern includes a first and a second wiring portions extending longitudinally of the substrate, the plurality of light emitting elements being arranged between the first wiring portion and the second wiring portion.

9. An image reading apparatus comprising:
a case;
a transparent plate supported by the case;
an image forming lens supported by the case; and
a linear light source for illuminating a document to be read, the linear light source including an insulating substrate having a first end and a second end opposite thereto, a plurality of light emitting elements supported on the substrate and arranged in a row extending from the first end to the second end, a wiring pattern in electrical connection with the plurality of light emitting elements, the wiring pattern including a first and a second wiring portions extending from the first end to the second end of the substrate, and a first and a second terminals formed on the substrate;
wherein the first wiring portion includes a connecting end located close to the first end of the substrate, the second wiring portion including a connecting end located close to the second end of the substrate, the connecting end of the first wiring portion being connected to the first terminal, the connecting end of the second wiring portion being connected to the second terminal so that the plurality of light emitting elements emit light of substantially equal brightness; and
wherein the substrate also carries image reading elements provided separately from the plurality of light emitting elements.

10. An image reading apparatus comprising:
a case;
a transparent plate supported by the case;
an image forming lens supported by the case; and
a linear light source for illuminating a document to be read, the linear light source including an insulating substrate, a plurality of light emitting elements arranged in a row on the substrate, a wiring pattern formed on the substrate in electrical connection with the plurality of light emitting elements for dividing the light emitting elements into a plurality of groups, and a first and a second terminals in conduction with the wiring pattern;
wherein the plurality of light emitting elements define a plurality of intervals between adjacent light emitting elements, one of the plurality of intervals being different in length from another of the intervals; and
wherein the substrate also carries image reading elements provided separately from the plurality of light emitting elements.

11. A linear light source comprising:
an insulating substrate having a first end and a second end opposite thereto;
a plurality of light emitting elements supported on the substrate and arranged in a row extending from the first end to the second end;
a wiring pattern in electrical connection with the plurality of light emitting elements, the wiring pattern including a first and a second wiring portions extending from the first end to the second end of the substrate; and
a first and a second terminals formed on the substrate;
wherein the first wiring portion includes a connecting end located close to the first end of the substrate, the second wiring portion including a connecting end located close to the second end of the substrate, the connecting end of the first wiring portion being connected to the first terminal, the connecting end of the second wiring portion being connected to the second terminal, whereby the plurality of light emitting elements emit light of substantially equal brightness; and
wherein the substrate also carries image reading elements provided separately from the plurality of light emitting elements.

12. The linear light source according to claim 11, wherein the plurality of light emitting elements are arranged between the first wiring portion and the second wiring portion and divided into a plurality of groups by the wiring pattern.

13. The linear light source according to claim 11, wherein the first and the second terminals are arranged closer to the second end than to the first end of the substrate.

14. The linear light source according to claim 11, wherein the substrate includes an intermediate portion located between the first end and the second end of the substrate, the first terminal and the second terminal being disposed at the intermediate portion.

15. The linear light source according to claim 11, wherein the plurality of light emitting elements are arranged on the substrate at substantially equal intervals.

16. A linear light source comprising:
an insulating substrate;
a plurality of light emitting elements arranged in a row on the substrate;
a wiring pattern formed on the substrate in electrical connection with the plurality of light emitting elements for dividing the plurality of light emitting elements into a plurality of groups; and
a first and a second terminals in conduction with the wiring pattern;
wherein the plurality of light emitting elements define a plurality of intervals between adjacent light emitting elements, one of the plurality of intervals being different in length from another of the intervals;
wherein the wiring pattern forms a plurality of current paths which correspond to the plurality of groups and extend from the first terminal to the second terminal; and
wherein the interval defined between the light emitting elements of a group corresponding to a shorter one of the current paths is narrower than the interval defined between the light emitting elements of another group corresponding to a longer one of the current paths.

17. A linear light source comprising:
an insulating substrate;
a plurality of light emitting elements arranged in a row on the substrate;
a wiring pattern formed on the substrate in electrical connection with the plurality of light emitting elements for dividing the plurality of light emitting elements into a plurality of groups; and
a first and a second terminals in conduction with the wiring pattern;
wherein the plurality of light emitting elements define a plurality of intervals between adjacent light emitting elements, one of the plurality of intervals being different in length from another of the intervals;

wherein the wiring pattern forms a plurality of current paths which correspond to the plurality of groups and extend from the first terminal to the second terminal; and wherein the substrate includes a first end and a second end opposite thereto, the row of light emitting elements extending in a direction from the first end toward the second end, the plurality of intervals becoming gradually narrower in said direction.

18. A linear light source comprising:

an insulating substrate;

a plurality of light emitting elements arranged in a row on the substrate;

a wiring pattern formed on the substrate in electrical connection with the plurality of light emitting elements for dividing the plurality of light emitting elements into a plurality of groups; and a first and a second terminals in conduction with the wiring pattern;

wherein the plurality of light emitting elements define a plurality of intervals between adjacent light emitting elements, one of the plurality of intervals being different in length from another of the intervals;

wherein the wiring pattern forms a plurality of current paths which correspond to the plurality of groups and extend from the first terminal to the second terminal; and wherein the substrate includes a first end, a second end opposite thereto, and an intermediate portion located between the first end and the second end, the row of light emitting elements extending from the first end to the second end, the plurality of intervals becoming gradually narrower from the intermediate portion toward the first end and the second end.

19. The linear light source according to claim 18, wherein the first terminal and the second terminal are disposed at the intermediate portion of the substrate.

* * * * *